US012673722B2

(12) United States Patent
Zhang

(10) Patent No.: US 12,673,722 B2
(45) Date of Patent: Jul. 7, 2026

(54) VEHICLE STEERING SYSTEM AND VEHICLE HAVING SAME

(71) Applicant: BYD COMPANY LIMITED, Shenzhen (CN)

(72) Inventor: Peng Zhang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 457 days.

(21) Appl. No.: 18/210,229

(22) Filed: Jun. 15, 2023

(65) Prior Publication Data

US 2023/0322298 A1 Oct. 12, 2023

Related U.S. Application Data

(63) Continuation of application No. PCT/CN2021/142669, filed on Dec. 29, 2021.

(30) Foreign Application Priority Data

Dec. 30, 2020 (CN) .......................... 202011630594.6
Dec. 30, 2020 (CN) .......................... 202023351625.2

(51) Int. Cl.
*B62D 6/00* (2006.01)
*B62D 5/00* (2006.01)
*B62D 15/02* (2006.01)

(52) U.S. Cl.
CPC ............. *B62D 6/008* (2013.01); *B62D 5/006* (2013.01); *B62D 15/0215* (2013.01); *B62D 15/029* (2013.01)

(58) Field of Classification Search
CPC ..................................................... B62D 6/008
See application file for complete search history.

(56) References Cited

U.S. PATENT DOCUMENTS

| | | | |
|---|---|---|---|
| 11,644,066 B2 | 5/2023 | Capela et al. | |
| 2003/0141134 A1* | 7/2003 | Sherwin ................. | B62D 5/003 |
| | | | 180/443 |

(Continued)

FOREIGN PATENT DOCUMENTS

| | | |
|---|---|---|
| CN | 204432743 U | 7/2015 |
| CN | 207747931 U | 8/2018 |

(Continued)

OTHER PUBLICATIONS

Machine Translation of JP 2017-007402 (Year: 2017).*

(Continued)

*Primary Examiner* — Kevin Hurley

(74) *Attorney, Agent, or Firm* — Sheppard Mullin Richter & Hampton LLP

(57) ABSTRACT

A vehicle steering system includes: a housing; a first steering shaft, disposed in the housing, where the first steering shaft is configured to be coupled with a steering gear to transmit a steering torque, or the first steering shaft is configured to be decoupled from the steering gear to interrupt a transmission of the steering torque; and a feeling simulator, connected with the first steering shaft, where in response to that the first steering shaft and the steering gear interrupt the transmission of the steering torque, the feeling simulator is configured to simulate a steering feeling of the transmission of the steering torque by the first steering shaft and the steering gear.

19 Claims, 12 Drawing Sheets

100

(56) References Cited

U.S. PATENT DOCUMENTS

| | | |
|---|---|---|
| 2003/0184072 A1 | 10/2003 | Andonian et al. |
| 2005/0155809 A1 | 7/2005 | Krzesicki et al. |
| 2005/0274565 A1 | 12/2005 | Greenwell et al. |
| 2009/0188728 A1 | 7/2009 | Osborne |
| 2018/0186400 A1 | 7/2018 | Hsu et al. |
| 2020/0130725 A1 | 4/2020 | Ishimura et al. |

FOREIGN PATENT DOCUMENTS

| | | |
|---|---|---|
| CN | 109229199 A | 1/2019 |
| CN | 110696912 A | 1/2020 |
| CN | 110949500 A | 4/2020 |
| CN | 110949501 A | 4/2020 |
| CN | 111006886 A | 4/2020 |
| CN | 210427027 U | 4/2020 |
| CN | 210971246 U | 7/2020 |
| CN | 111559420 A | 8/2020 |
| CN | 211336154 U | 8/2020 |
| CN | 211336155 U | 8/2020 |
| CN | 211336156 U | 8/2020 |
| CN | 211494208 U | 9/2020 |
| CN | 211869497 U | 11/2020 |
| CN | 211869498 U | 11/2020 |
| CN | 214112672 U | 9/2021 |
| DE | 102018217506 A1 | 4/2020 |
| EP | 1097855 A2 | 5/2001 |
| EP | 3376070 A1 | 9/2018 |
| EP | 3647157 A1 | 5/2020 |
| JP | 2000-198453 A | 7/2000 |
| JP | 2001191937 A | 7/2001 |
| JP | 2003048550 A | 2/2003 |
| JP | 2004-210200 A | 7/2004 |
| JP | 2006062527 A | 3/2006 |
| JP | 2006193083 A | 7/2006 |
| JP | 2013177045 A | 9/2013 |
| JP | 2017007402 A | 1/2017 |
| JP | 2018155301 A | 10/2018 |
| JP | 2020069844 A | 5/2020 |
| JP | 2020193658 A | 12/2020 |
| KR | 20100099498 A | 9/2010 |
| KR | 10-1491304 B1 | 2/2015 |
| WO | 2020/031294 A1 | 2/2020 |

OTHER PUBLICATIONS

International Search Report and Written Opinion for Application No. PCT/CN2021/142669. mailed on Mar. 21, 2022, 12 pages.

Examination Report No. 1 dated Jul. 9, 2024, issued in Australian Patent Application No. 2021416210 (4 pages).

Extended European Search Report dated Apr. 16, 2024, issued in European Patent Application No. 21914537.2 (9 pages).

Notice of Reasons for Refusal dated Jun. 25, 2024, issued in Japanese Patent Application No. 2023-538053, with English machine translation (11 pages).

Notice of Reasons for Refusal dated Jan. 7, 2025, issued in Japanese Patent Application No. 2023-538053, with English machine translation (11 pages).

Request for the Submission of an Opinion dated Feb. 11, 2025, issued in Korean Patent Application No. 10-2023-7019886, with English machine translation (9 pages).

Notice of Final Rejection dated Sep. 12, 2025, issued in Korean Patent Application No. 10-2023-7019886, with English machine translation (6 pages).

First Office Action and Search Report dated Nov. 24, 2022, issued in Chinese Patent Application No. 202011630594.6, with English machine translation (20 pages).

Second Office Action and Supplementary Search Report dated Jun. 19, 2023, issued in Chinese Patent Application No. 202011630594.6, with English machine translation (27 pages).

* cited by examiner

100

1

31

A-A

B-B

VEHICLE STEERING SYSTEM AND VEHICLE HAVING SAME

CROSS-REFERENCE TO RELATED APPLICATIONS

This application is a Continuation Application of International Patent Application No. PCT/CN2021/142669, filed on Dec. 29, 2021, which is based on and claims priority to and benefits of Chinese Patent Application No. 202023351625.2 and No. 202011630594.6 both filed on Dec. 30, 2020. The entire content of all of the above-referenced applications is incorporated herein by reference.

FIELD

The present disclosure relates to the field of vehicle technologies, and more particularly, a vehicle steering system and a vehicle having the same.

BACKGROUND

In the related art, an upper portion of a first steering shaft of a vehicle is usually fixed to a steering wheel, and a lower portion of the first steering shaft is usually connected with a steering gear. Therefore, a steering torque acting on the steering wheel is transmitted to the steering gear to realize the steering of the vehicle. However, the vehicle steering system has relatively undiversified functions. When the vehicle has emerging functions such as an on-board multimedia function, a drive-by-wire function, and an automatic driving function, a feeling of real the steering of the vehicle needs to be simulated to improve the user experience.

SUMMARY

The present disclosure resolves at least one of the technical problems existing in the related art. In a first aspect, the present disclosure provides a vehicle steering system. The vehicle steering system may simulate a steering feeling of transmission of a steering torque by a first steering shaft and a steering gear when the first steering shaft and the steering gear interrupt the transmission of the steering torque, thereby effectively improving the user experience.

In a second aspect, the present disclosure provides a vehicle having the vehicle steering system.

The vehicle steering system according to an embodiment of the present disclosure includes: a housing; a first steering shaft disposed in the housing, where the first steering shaft is configured to be coupled to a steering gear to transmit a steering torque, or the first steering shaft is configured to be decoupled from the steering gear to interrupt a transmission of the steering torque; and a feeling simulator, connected with the first steering shaft, where in response to that the first steering shaft and the steering gear interrupt the transmission of the steering torque, the feeling simulator is configured to simulate a steering feeling of the transmission of the steering torque by the first steering shaft and the steering gear.

In the vehicle steering system according to the embodiments of the present disclosure, the feeling simulator is arranged and configured to simulate a steering feel of the transmission of the steering torque by the first steering shaft and the steering gear in a case that the first steering shaft and the steering gear interrupted the transmission of the steering torque. When the vehicle has emerging functions such as an on-board multimedia function, a drive-by-wire function, and an autonomous driving function, the vehicle can be configured to simulate the real steering feel such as the steering damping feeling and the restoring force, and ensure the authenticity of the simulation and effectively improve the user experience.

According to some embodiments of this application, the feeling simulator includes: a feeling driver, having an output shaft and disposed on the housing; a driving member, fixed on the output shaft; and a driven member, fixed on the first steering shaft and engaged with the driving member.

According to some embodiments of the present disclosure, the vehicle steering system further includes: a rotation angle detector, configured to detect a rotation direction of the first steering shaft; and a controller, configured to communicate with the rotation angle detector and the feeling driver, where in response to that the first steering shaft turns, the controller controls the feeling driver to provide a resistance against the turning of the first steering shaft from an original position; and in response to that the first steering shaft restores to the original position, the controller controls the feeling driver to provide assistance to the restoring of the first steering shaft.

According to some embodiments of the present disclosure, the vehicle steering system further includes: a torque detector, configured to detect a driving condition of a vehicle and transmit a first torque signal; and a controller, configured to communicate with the torque detector and the feeling driver, receive the first torque signal, and control, according to the first torque signal, the feeling driver to provide the first steering shaft with a first road feel simulation torque that simulates a first road feel torque transmitted by the first steering shaft and the steering gear.

According to some embodiments of the present disclosure, the vehicle steering system further includes: a driving computer, configured to communicate with the controller and detect a driving attitude of the vehicle and transmit a second torque signal to the controller, where the controller is configured to control, according to the second torque signal, the feeling driver to provide the first steering shaft with a second road feel simulation torque that simulates a second road feel torque transmitted by the first steering shaft and the steering gear.

According to some embodiments of the present disclosure, the vehicle steering system further includes: a safety detector, configured to detect whether a driver drives safely; and a controller, configured to communicate with the safety detector and the feeling driver, where in response to that the safety detector detects a safety risk of the driver in the driving, the controller controls the feeling driver to provide a vibration force to drive the first steering shaft to rotate forward and backward.

According to some embodiments of the present disclosure, the safety detector includes at least one of a fatigue detector, a lane departure detector, a collision detector, a lane change blind area detector, and/or a reversing collision detector.

According to some embodiments of the present disclosure, the housing includes: a body, where the first steering shaft and the driven member are disposed in the body; and an accommodating portion, protruding from an outer surface of the body, where an interior of the accommodating portion is in communication with an interior of the body; and the driving member is disposed in the accommodating portion.

According to some embodiments of the present disclosure, a part of the driving member extends into the body and is engaged with the driven member.

According to some embodiments of the present disclosure, an end of the output shaft extends into the accommodating portion from a first end of the accommodating portion and is coupled to a first end of the driving member; a support member is disposed on a second end of the accommodating portion; and the a second end of the driving member extends through the support member.

According to some embodiments of the present disclosure, the second end of the accommodating portion is open and comprises an end cover.

According to some embodiments of the present disclosure, a central axis of the accommodating portion is perpendicular to a central axis of the body.

According to some embodiments of the present disclosure, the accommodating portion and the body are formed as one piece.

According to some embodiments of the present disclosure, the feeling driver is connected to the accommodating portion.

According to some embodiments of the present disclosure, the driving member comprises a worm; and the driven member comprises a worm gear meshed with the worm.

According to some embodiments of the present disclosure, a spiral angle of the worm gear is $\beta$; and where $30° \leq \beta \leq 40°$.

According to some embodiments of the present disclosure, the vehicle steering system further include a coupling device. The coupling device includes the first steering shaft and the second steering shaft. The first steering shaft is connected with the steering gear. The first steering shaft is configured to move between a coupling position and a decoupling position. The first steering shaft is coupled to the second steering shaft at the coupling position and transmits the steering torque of the steering gear. The first steering shaft is decoupled from the second steering shaft at the decoupling position and interrupts the transmission of the steering torque of the steering gear.

According to some embodiments of the present disclosure, the coupling device further includes a third steering shaft. The first steering shaft is connected to the steering gear through the third steering shaft. The first steering shaft is engaged with the third steering shaft to transmit the steering torque of the steering gear. The first steering shaft is configured to move between the coupling position and the decoupling position with respect to the third steering shaft.

According to some embodiments of the present disclosure, the coupling device further includes: a shaft sleeve, sleeved on the first steering shaft, where the shaft sleeve is coupled with the first steering shaft and configured to rotate with respect to the first steering shaft; and a driving assembly, connected with the shaft sleeve, where the driving assembly is configured to drive the first steering shaft to move between the coupling position and the decoupling position through the shaft sleeve.

The vehicle in an embodiment of the present disclosure includes the vehicle steering system according to any of the above embodiments of the present disclosure.

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description of the embodiments made with reference to the following accompanying drawings.

REFERENCE NUMERALS

Figure 1:
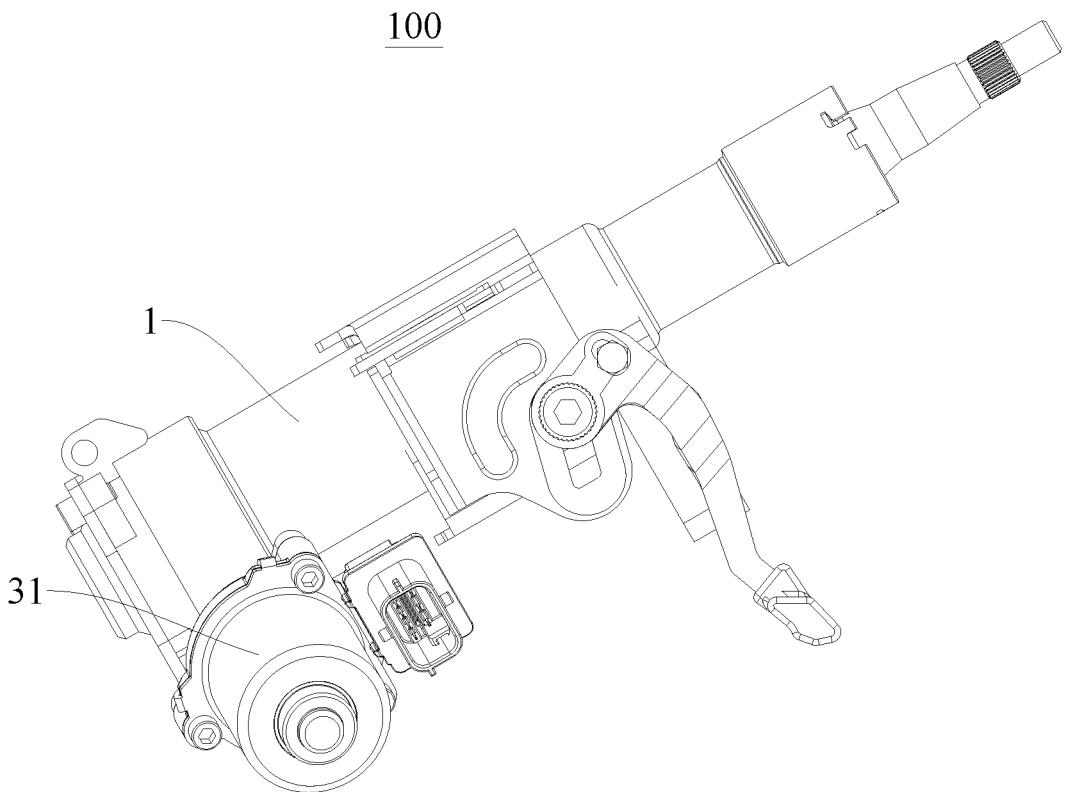
FIG. 1 is a three-dimensional view of a vehicle steering system according to an embodiment of the present disclosure.

100: Vehicle steering system;
1: Housing; 11: Body; 12: Accommodating portion; 121: End cover;
2: Steering shaft; 3: Feeling simulator; 31: Feeling driver;
32: Driving member; 321: Connecting portion; 33: Driven member; 4: Support member.
First transmission shaft 110, Second transmission shaft 200, Spline groove 210, Shaft sleeve 300, Driving assembly 400, Driving device 430, Transmission mechanism 440, Output lead screw 441, Output nut 442, Connecting rod mechanism 450, First connecting rod 451, Second connecting rod 452, Third connecting rod 453, Third transmission shaft 500, Cavity 510, and Housing 600.

DETAILED DESCRIPTION

The embodiments of the present disclosure are described in detail below, and the embodiments described with reference to accompanying drawings are exemplary.

A vehicle steering system 100 according to embodiments of the present disclosure is described below with reference to FIG. 1 to FIG. 9.

Figure 20:
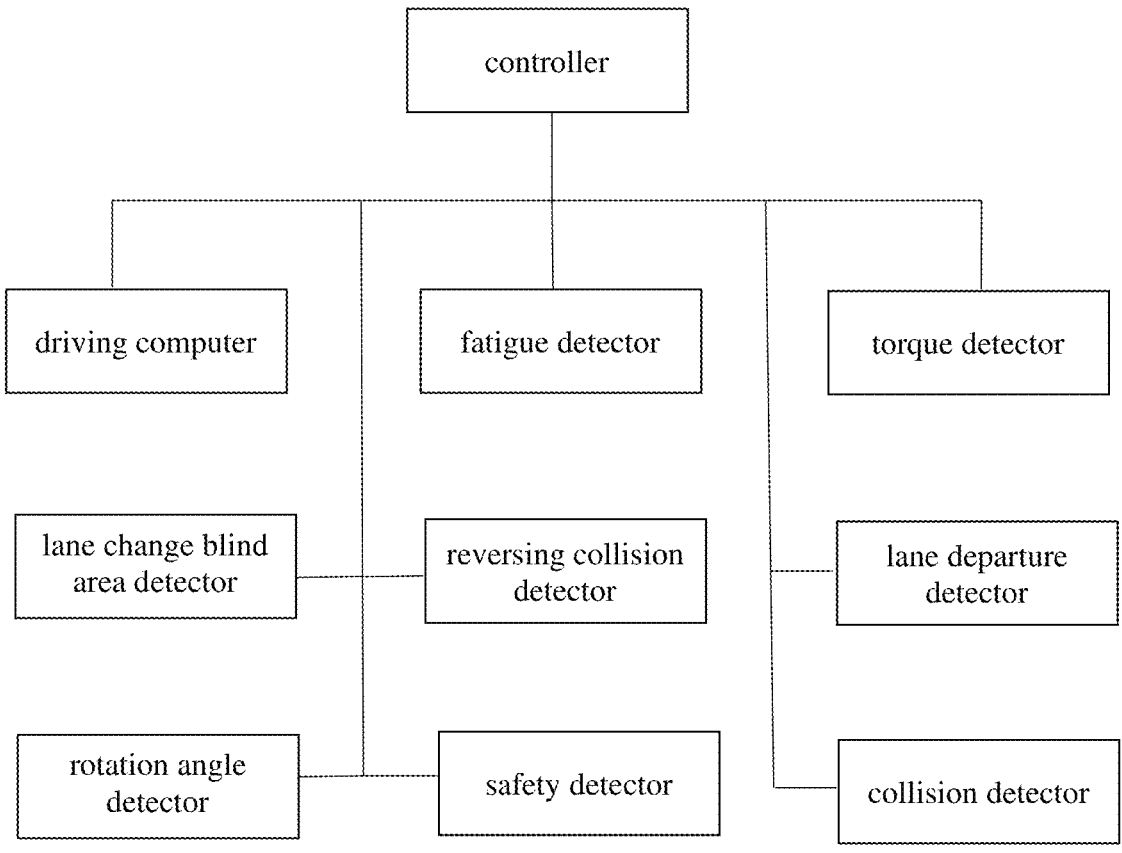
FIG. 20 is a schematic diagram of a vehicle steering system according to an embodiment of the present disclosure.

As shown in FIG. 1 to FIG. 4, the vehicle steering system 100 according to the embodiments of the present disclosure includes a housing 1, a first steering shaft 2, and a feeling simulator 3. As shown in FIG. 20, in some embodiments, the vehicle steering system 100 may also include a controller, a rotation angle detector, a torque detector, a driving computer, a safety detector, a fatigue detector, a lane departure detector, a collision detector, a lane change blind area detector, and a reversing collision detector.

In an embodiment, the first steering shaft 2 is rotatably arranged/disposed in the housing 1, the first steering shaft 2 is configured to be coupled to a steering gear to transmit a steering torque, and the first steering shaft 2 is configured to be decoupled from the steering gear to interrupt the transmission of the steering torque. The feeling simulator 3 is connected with the first steering shaft 2. The feeling simulator 3 simulates a steering feeling of the transmission of the steering torque by the first steering shaft 2 and the steering gear when the first steering shaft 2 and the steering gear interrupt the transmission of the steering torque.

For example, when a driver controls a steering wheel of a vehicle to drive the first steering shaft 2 to turn, the feeling simulator 3 can provide resistance to the first steering shaft 2, thereby simulating the control damping feeling during the steering. When the driver controls a steering wheel of a vehicle to drive the first steering shaft 2 to restore to its original position, the feeling simulator 3 may provide a restoring torque for the first steering shaft 2, thereby simulating a restoring force. As a result, the feeling simulator 3 may be arranged/disposed to simulate the real steering feel such as the steering damping feeling, the restoring force, and the like of the transmission of the steering torque by the first steering shaft 2 and the steering gear when the first steering shaft 2 and the steering gear interrupt the transmission of the steering torque. When the vehicle steering system 100 is a steering-by-wire system, the driving safety of the driver can be effectively improved. When the vehicle steering system 100 is a driving simulation system such as a steering system of a game vehicle, the game experience can be improved and the authenticity of simulation is ensured.

It should be noted that, the "steering-by-wire system" is a vehicle steering system 100 that eliminates a conventional mechanical connection between a steering wheel and a turning wheel (in this case, the first steering shaft 2 and the steering gear interrupt the transmission of the steering torque), transmits a signal through a data bus, and acquires a feedback command from a steering control system.

In the vehicle steering system 100 according to the embodiments of the present disclosure, the feeling simulator 3 is arranged/disposed and the feeling simulator 3 simulates a steering feeling during the transmission of the steering torque by the first steering shaft 2 and the steering gear, when the first steering shaft 2 and the steering gear interrupt the transmission of the steering torque. When the vehicle has emerging functions such as an on-board multimedia function, a drive-by-wire function, and an autonomous driving function, the vehicle can be configured to simulate the steering feeling such as the steering damping feeling and the restoring force, and can ensure the authenticity of the simulation and improve the user experience.

Figure 3:
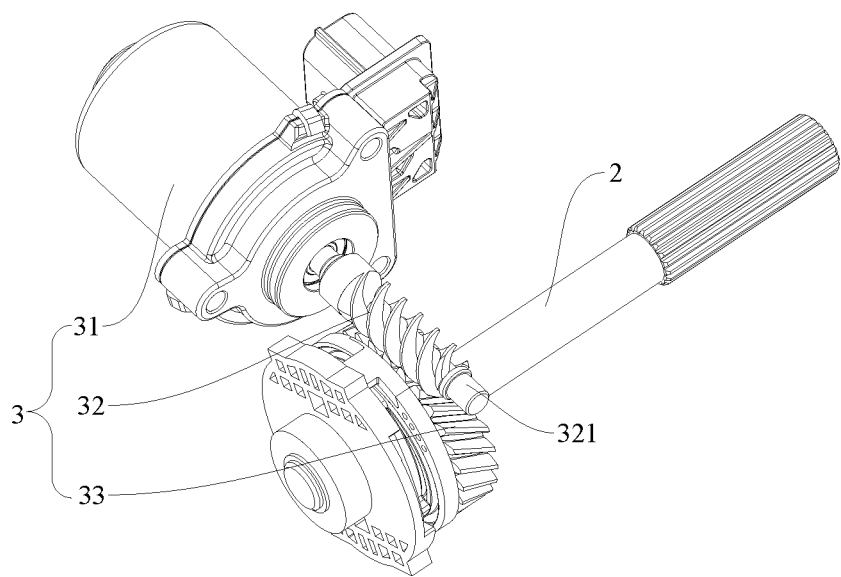
FIG. 3 is a schematic diagram showing engagement between a feeling simulator and a first steering shaft of a vehicle steering system according to an embodiment of the present disclosure.
Figure 4:
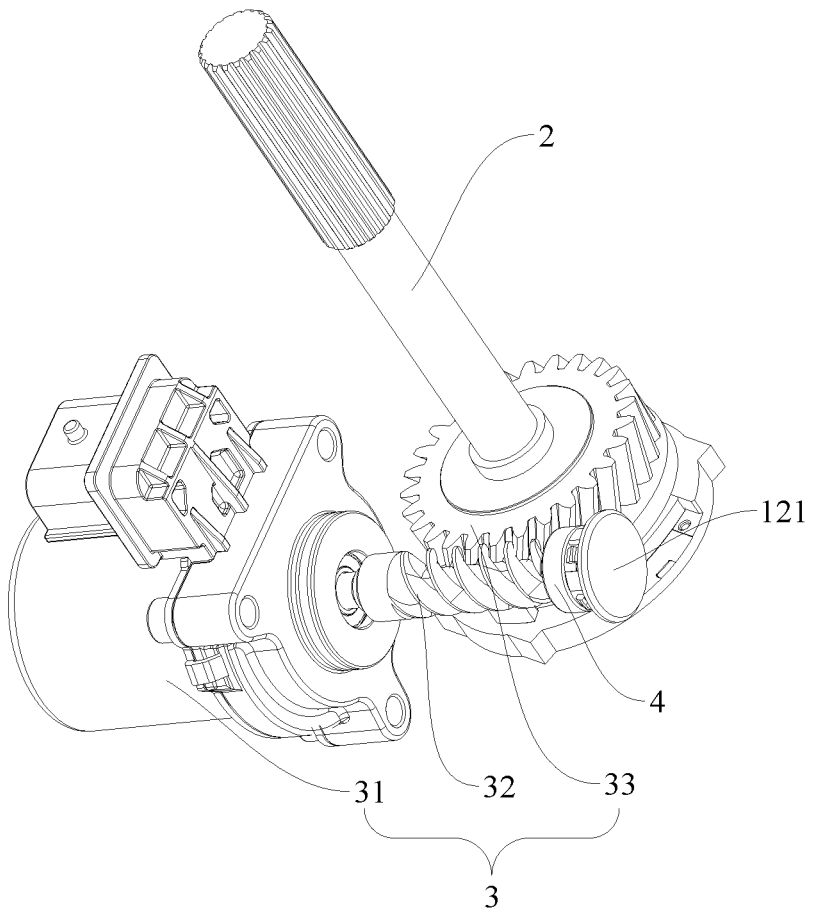
FIG. 4 is a schematic diagram showing engagement between a feeling simulator and a first steering shaft of a vehicle steering system from another perspective according to an embodiment of the present disclosure.
Figure 5:
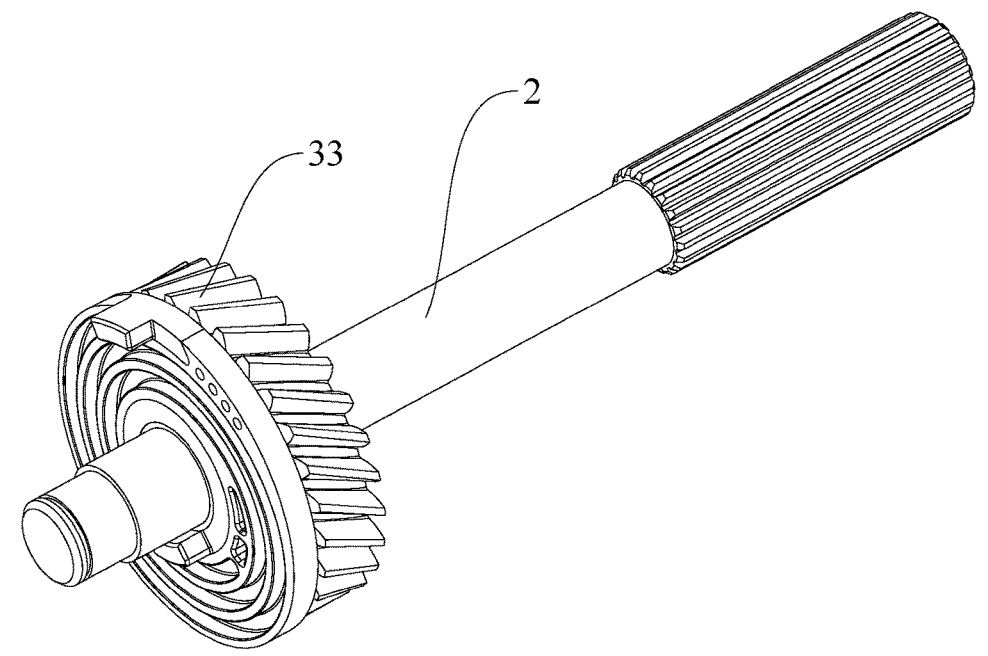
FIG. 5 is an assembly schematic diagram of a first steering shaft and a driven member of a vehicle steering system according to an embodiment of the present disclosure.

In some embodiments of the present disclosure, referring to FIG. 3 and FIG. 4, the feeling simulator 3 includes a feeling driver 31, a driving member 32, and a driven member 33. In an embodiment, the feeling driver 31 has an output shaft. The feeling driver 31 is arranged/disposed on the housing 1. The driving member 32 is fixed to the output shaft. The driven member 33 is fixed to the first steering shaft 2. The driven member 33 is engaged with the driving member 32.

Since the driven member 33 is fixed to the first steering shaft 2, the driven member 33 rotates with the first steering shaft 2 when the first steering shaft 2 rotates. When the driver controls the steering wheel of the vehicle to drive the first steering shaft 2 and the driven member 33 to turn, the feeling driver 31 can drive the driving member 32 to rotate through the output shaft and provide a torque opposite to a rotation direction of the driven member 33, thereby providing the resistance for the rotation of the driven member 33 for simulating the steering damping feeling. When the driver controls the steering wheel of the vehicle to drive the first steering shaft 2 and the driven member 33 to restore, the feeling driver 31 can drive the driving member 32 to rotate and provide the same torque as the rotation direction of the driven member 33, thereby providing the assistance for the rotation of the driven member 33 for simulating the restoring force. Moreover, when the feeling driver 31 alternately rotates forward and backward at a high frequency, a function of vibration prompt can be realized. In addition, while ensuring the authenticity of the simulation, the structure of the feeling simulator 3 is simple and easy to implement. The feeling driver 31 may be a feeling motor. However, the feeling driver is not limited thereto.

In some embodiments of the present disclosure, the vehicle steering system 100 further includes a rotation angle detector (not shown) and a controller (not shown). The rotation angle detector is configured to detect a rotation direction of the first steering shaft 2. The controller is configured to communicate with the rotation angle detector and the feeling driver 31. When the first steering shaft 2 turns, the controller controls the feeling driver 31 to provide the resistance against the turning of the first steering shaft 2. When the first steering shaft 2 restores, the controller controls the feeling driver 31 to provide the assistance for the restoring of the first steering shaft 2.

For example, when the rotation angle detector detects a steering signal, the rotation angle detector transits the detected steering signal to the controller, and the controller controls the feeling driver 31 to rotate according to the received steering signal. In this case, the feeling driver 31 drives the driving member 32 to rotate and causes the driving member 32 to provide a torque opposite to the rotation direction of the driven member 33 and the first steering shaft 2, thereby providing the resistance for the rotation of the first steering shaft 2, so as to simulate the steering damping feeling during the transmission of the steering torque by the first steering shaft 2 and the steering gear. For example, when the rotation angle detector detects a restoring signal, the rotation angle detector transits the detected restoring signal to the controller, and the controller controls the feeling driver 31 to rotate according to the received restoring signal. In this case, the feeling driver 31 drives the driving member 32 to rotate and causes the driving member 32 to provide the same torque as the rotation direction of the driven member 33 and the first steering shaft 2, thereby providing the assistance for the restoring of the first steering shaft 2, so as to simulate the restoring force during the transmission of the steering torque by the first steering shaft 2 and the steering gear. As a result, the rotation angle detector and the controller are configured to simulate the steering damping feeling and the restoring force during the transmission of the steering torque by the first steering shaft 2 and the steering gear, when the first steering shaft 2 and the steering gear interrupt the transmission of the steering torque, thereby improving the authenticity and the reliability of the simulation.

In some embodiments of the present disclosure, the vehicle steering system 100 further includes a torque detector (not shown in the figure). The torque detector is configured to detect a driving condition of a vehicle and transmit a first torque signal. The controller is configured to communicate with the torque detector and the feeling driver 31, receive the first torque signal, and control, according to the first torque signal, the feeling driver 31 to provide the first steering shaft 2 with a road feel simulation torque that simulates a road feel torque transmitted by the first steering shaft 2 and the steering gear.

For example, when a road condition (such as a steep slope, a slope, a muddy road, a rocky road, or a pothole road, and the like) is different, the first torque signal received by the controller is different. Therefore, a different road feel simulation torque can be provided to the first steering shaft 2. Since the first steering shaft 2 is usually connected to the steering wheel, the first steering shaft 2 can transmit the road feel simulation torque to the steering wheel, so as to clearly feedback the road condition of the vehicle. Therefore, by the configuration of the torque detector, the controller can control the feeling driver 31 to rotate according to the first torque signal detected by the torque detector and cause the feeling driver 31 to provide the road feel simulation torque to the first steering shaft 2, when the vehicle steering system 100 is the steering-by-wire system. In this way, the feedback force of the vehicle steering system 100 on the vehicle road can be simulated in real time, and the driving condition of the vehicle can be effectively fed back, providing the driver with a more real feeling of the road and improving the vehicle maneuverability.

In an embodiment of the present disclosure, the vehicle steering system 100 further includes a driving computer. The driving computer is configured to communicate with the controller and detect a driving attitude of the vehicle and transmit a second torque signal to the controller. The controller is configured to control, according to the second torque signal, the feeling driver 31 to provide the first steering shaft 2 with the road feel simulation torque that simulates the road feel torque transmitted by the first steering shaft 2 and the steering gear. The "driving attitude of the vehicle" refers to the attitude of the vehicle in a driving state. For example, under the influence of the external environment, the vehicle may experience sideslip, fishtailing, and other conditions, causing the center of gravity of the vehicle to change, and the posture of the vehicle to change as well. It should be noted that the driving computer may be the vehicle controller.

For example, when the vehicle travels at a high speed, the controller can control the feeling driver 31 to rotate according to the second torque signal transmitted by the driving computer and cause the feeling driver 31 provide a large torque for the first steering shaft 2 and the steering wheel, so as to increase a weight of the steering wheel and make the steering wheel more stable. When the vehicle travels at a low speed, the controller can control the feeling driver 31 to rotate according to the second torque signal transmitted by the driving computer and cause the feeling driver 31 drive the steering wheel lighter through the first steering shaft 2, thereby causing the steering wheel to rotate more easily. When the vehicle sideslips, the controller can control the feeling driver 31 to rotate according to the second torque signal transmitted by the driving computer and cause the feeling driver 31 to correct the steering wheel through the first steering shaft 2, so as to ensure the driving safety.

Therefore, by arranging the driving computer, the controller can control the feeling driver 31 to rotate according to the second torque signal provided by the driving computer and cause the feeling driver 31 to provide the road feel simulation torque to the first steering shaft 2 and the steering wheel, when the vehicle steering system 100 is the steering-by-wire system and the driving simulation system such as a steering system of a game vehicle. The driving attitude of the vehicle is effectively fed back, so that the feedback force of the driving attitude of the vehicle to the vehicle steering system 100 can be simulated in real time, which provides the driver with a more real road feel and further improves the vehicle maneuverability.

In some embodiments of the present disclosure, the vehicle steering system 100 further includes a safety detector. The safety detector is configured to detect whether a driver drives safely. The controller is configured to communicate with the safety detector and the feeling driver 31. The controller controls the feeling driver 31 to provide a vibration force to drive the first steering shaft 2 to alternately rotate forward and backward when the safety detector detects a safety risk in the driving. In this way, the safety detector and the controller can be configured to play a role of vibration warning when there is a safety risk in driving. In this way, the vibration feeling can be provided to the driver, which can effectively improve the driving safety.

In an embodiment, the safety detector includes at least one of a fatigue detector, a lane departure detector, a collision detector, a lane change blind area detector, and a reversing collision detector. For example, when the safety detector includes the fatigue detector, and the fatigue detector detects fatigue driving of the driver and transmits a detected fatigue signal to the controller, the controller controls, according to the received fatigue signal, the feeling driver 31 to alternately rotate forward and backward, so as to realize an effect of fatigue driving prompt, thereby reducing a risk of a traffic accident caused by the fatigue driving.

When the safety detector includes the lane departure detector, and the lane departure detector detects that the vehicle is about to deviate from the lane and transmits a detected lane departure warning signal to the controller, the controller can control, according to the received lane departure warning signal, the feeling driver 31 to alternately rotate forward and backward, so that a lane departure warning can
be realized, and the risk of the traffic accident caused by the
lane deviation can be reduced.

When the safety detector includes the collision detector,
and the collision detector detects that the vehicle is about to
collide with other vehicles, pedestrians and obstacles, the
collision detector transmits a collision warning signal to the
controller. The controller can control, according to the
received collision warning signal, the feeling driver 31
alternately rotate forward and backward, so that a collision
warning can be realized and occurrence of the collision can
be avoided.

When the safety detector includes the lane change blind
area detector, since there is a blind area in a rearview mirror
of the vehicle, the lane change blind area detector can detect
an overtaking vehicle in the blind area of the rearview mirror
and transmits a risk signal to the controller, and the con-
troller can control, according to the received risk signal, the
feeling driver 31 to alternately rotate forward and backward.
In this way, the blind area prompt of the lane change can be
realized to avoid the traffic accident due to the blind area in
the process of the lane change.

When the safety detector includes the reversing collision
detector, and the vehicle is in a dangerous distance between
an obstacle and a vehicle when reversing, or when a pedes-
trian or a vehicle is suddenly near the rear of the vehicle
during the process of reversing, the reversing collision
detector transmits a reverse collision warning signal to the
controller. The controller can control, according to the
received collision warning signal, the feeling driver 31
alternately rotate forward and backward, so as to realize a
reverse collision warning and avoid a safety accident during
the reversing process.

Therefore, through the above arrangement, the vehicle
steering system 100 can realize at least one of the fatigue
driving warning, the lane departure warning, the collision
warning, the lane change blind area warning, and the reverse
collision warning, thereby reducing the risk of traffic acci-
dent and effectively improving the driving safety. Certainly,
the safety detector may also include other types of detectors,
not limited to the fatigue detector, the lane departure detec-
tor, the collision detector, the lane change blind area detec-
tor, and the reversing collision detector.

Figure 2:
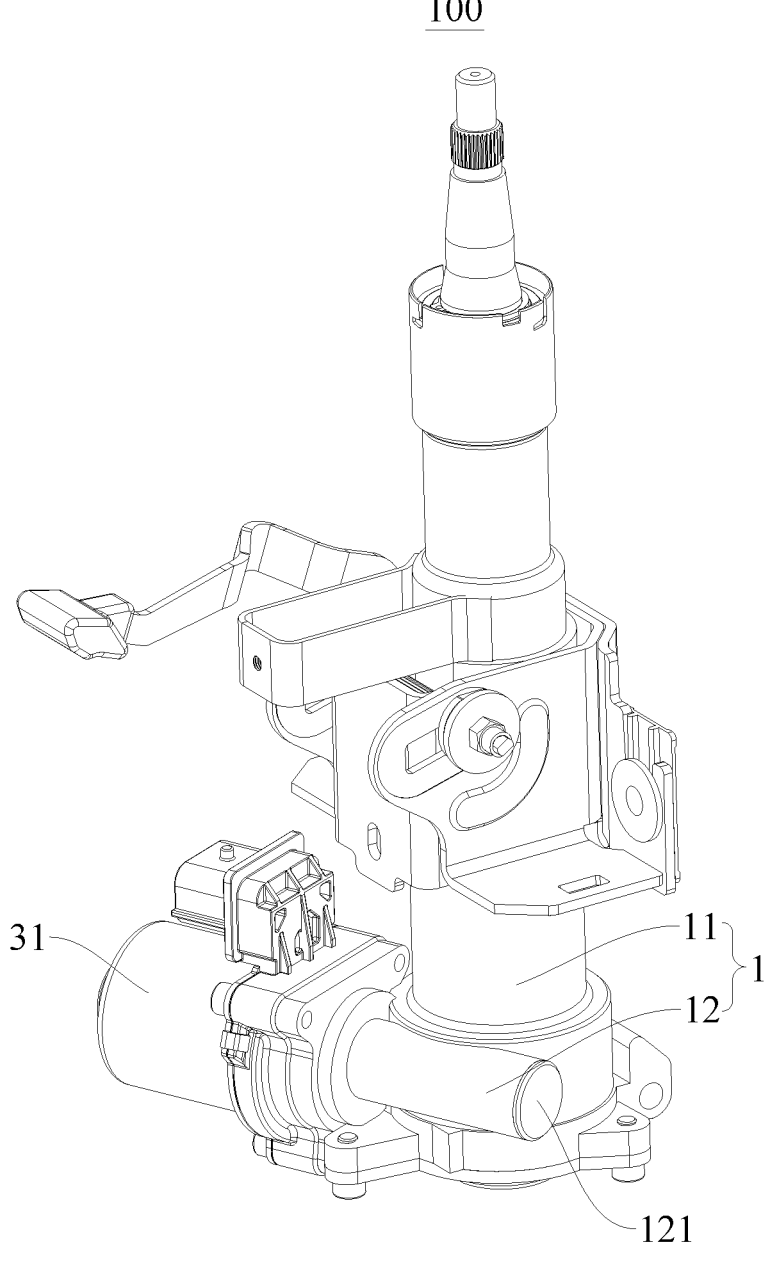
FIG. 2 is a three-dimensional view of the vehicle steering system shown in FIG. 1 from another perspective.
Figure 6:
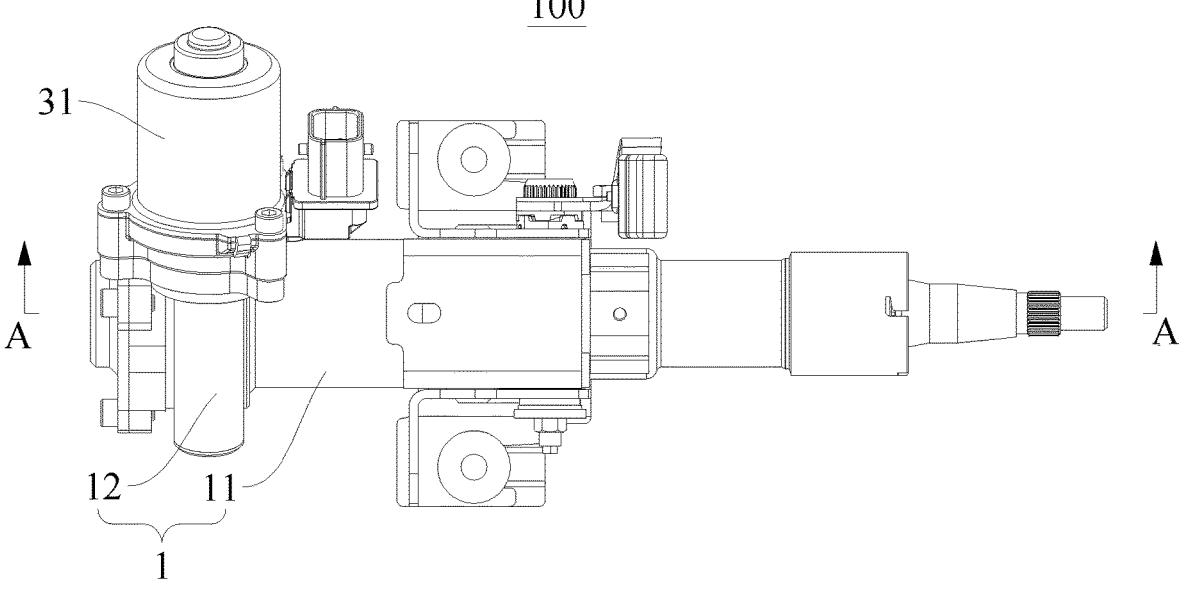
FIG. 6 is a schematic structural diagram of a vehicle steering system according to an embodiment of the present disclosure.
Figure 7:
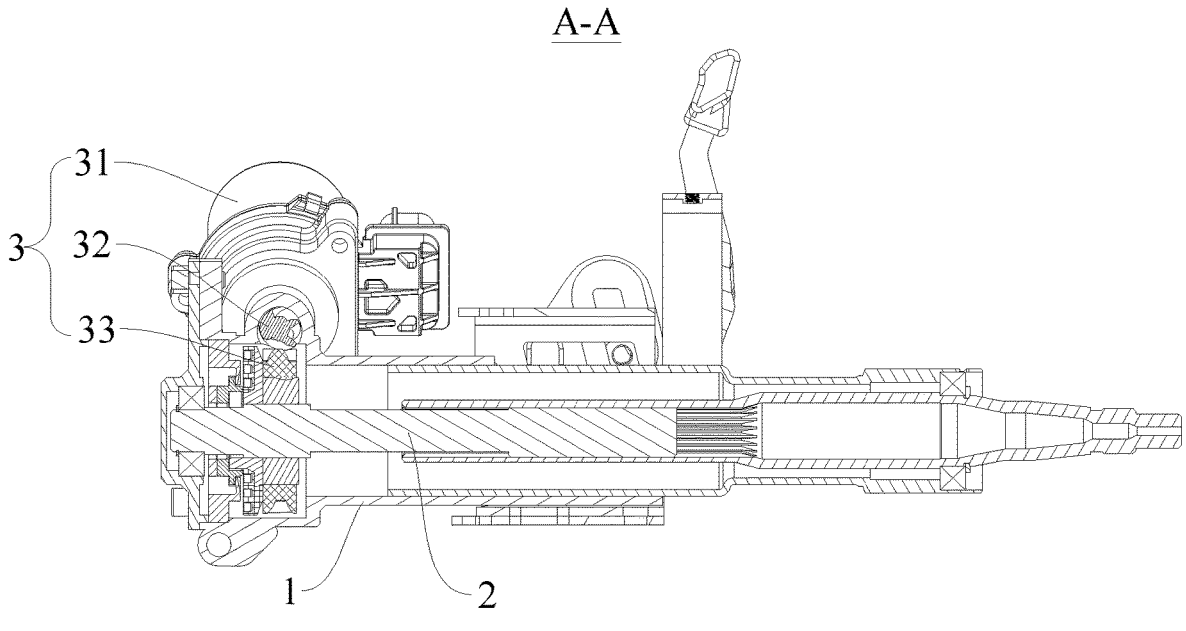
FIG. 7 is a cross-sectional view taken along line A-A in FIG. 6.
Figure 8:
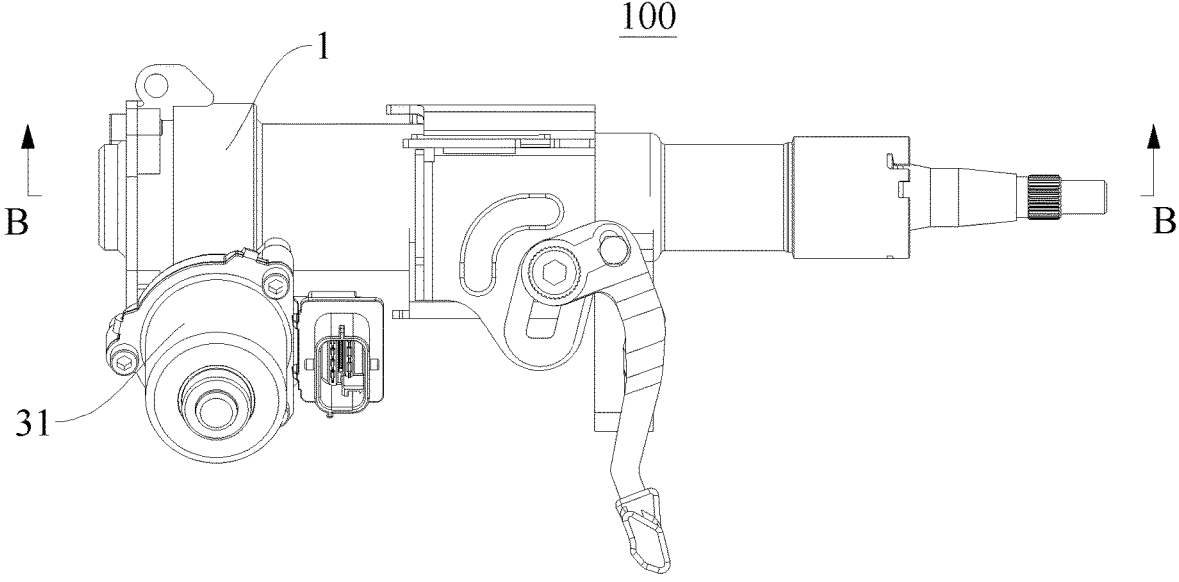
FIG. 8 is another schematic structural diagram of a vehicle steering system according to an embodiment of the present disclosure.
Figure 9:
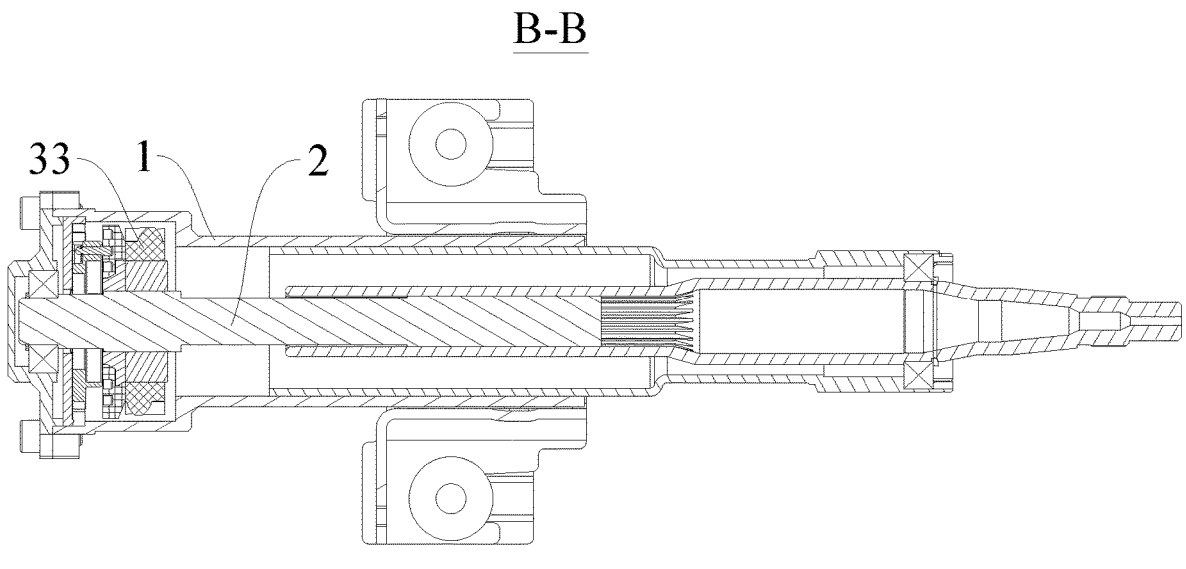
FIG. 9 is a cross-sectional view taken along line B-B in FIG. 8.

In some embodiments of the present disclosure, with
reference to FIG. 2 and FIG. 6, the housing 1 includes a body
11 and an accommodating portion 12. The first steering shaft
2 and the driven member 33 are arranged/disposed in the
body 11. The accommodating portion 12 protrudes from an
outer surface of the body 11. An interior of the accommo-
dating portion 12 is in communication with an interior of the
body 11. The driving member 32 is arranged in the accom-
modating portion 12. For example, in the example of FIG.
2 and FIG. 6, the accommodating portion 12 is connected to
a radially outer side of the body 11, and a shape of the
accommodating portion 12 is adapted to a shape of the
driving member 32. Therefore, by arranging the body 11 and
the accommodating portion 12, on the one hand, the body 11
can effectively protect the first steering shaft 2 and the driven
member 33, and the accommodating portion 12 can effec-
tively protect the driving member 32, so that impurities such
as the external dust can be prevented from entering the
interior of the housing 1 and affecting the rotation of the first
steering shaft 2, the driven member 33, and the driving
member 32. On the other hand, occupied space of the
accommodating portion 12 is small, and the structure of the
entire vehicle steering system 100 can be made more com-
pact, thereby reducing the occupied space of the vehicle steering system 100 in the vehicle, facilitating a spatial
layout of other parts in the vehicle, and increasing leg
movement space of the driver.

In an embodiment, a part of the driving member 32
extends into the body 11 and engages with the driven
member 33. Such an arrangement can ensure the reliability
of the engagement between the driving member 32 and the
driven member 33, so that the vehicle steering system 100
may have functions such as steering damping feeling, road
feeling feedback, steering restoring force, and vibration
prompt. Moreover, since a part of the driving member 32
extends into the body 11, a radial dimension of the driven
member 33 can be smaller, so that structural compactness of
the vehicle steering system 100 can be further improved, and
the occupied space of the entire vehicle steering system 100
can be reduced.

In some embodiments of the present disclosure, referring
to FIG. 2 to FIG. 4, a free end of the output shaft extends into
the accommodating portion 12 from one end (e.g., a first
end) of the accommodating portion 12 (for example, a left
end in FIG. 2) and is fixed/coupled to one end (e.g., a first
end) of the driving member 32 (for example, a left end in
FIG. 4). A support member 4 is arranged/disposed in the
other end (e.g., a second end) of the accommodating portion
12 (for example, a right end in FIG. 2), and the other end
(e.g., a second end) of the driving member 32 (for example,
a right end in FIG. 4) rotatably extends through the support
member 4.

In the examples of FIG. 3 and FIG. 4, one end of the
driving member 32 away from the feeling driver 31 may be
provided with a connecting portion 321. A diameter of the
connecting portion 321 is less than a diameter of the driving
member 32. A through fitting hole may be formed on the
support member 4, and the connecting portion 321 fits in
with the fitting hole. A diameter of the fitting hole is greater
than the diameter of the connecting portion 321 and less than
the diameter of the driving member 32. In this way, when the
support member 4 is fixed to the accommodating portion 12,
the radial movement of the connecting portion 321 relative
to the support member 4 may be limited, and the axial
movement of the driving member 32 relative to the support
member 4 may be limited. As a result, by arranging the
support member 4, one end of the driving member 32 away
from the feeling driver 31 may be supported on the support
member 4, so that the rotation of the driving member 32 can
be more stable, thereby improving the fitting/coupling sta-
bility between the driving member 32 and the driven mem-
ber 33.

In an embodiment, as shown in FIG. 2 to FIG. 4, the other
end (such as, a right end in FIG. 2) of the accommodating
portion 12 is open, and the other end (such as, the right end
in FIG. 2) of the accommodating portion 12 is provided with
a detachable end cover 121. In this way, the end cover 121
has better stopping and limiting effects, and an axial posi-
tioning of the support member 4 can be realized, thereby
further ensuring the rotational stability of the driving mem-
ber 32. Moreover, the end cover 121 can ensure the tightness
of the housing 1, and prevent impurities such as external
dust from entering the housing 1 through the other end of the
accommodating portion 12 and affecting the operation of the
driving member 32 and the driven member 33, so that the
reliability of the engagement between the driving member
32 and the driven member 33 can be guaranteed. In addition,
when the support member 4 is mounted, the support member
4 can be extended from the open end of the accommodating
portion 12 into the accommodating portion 12 and the
driving member 32 can be sleeved on the support member 4, and the end cover 121 can be mounted to the accommodating portion 12. The support member 4 can be disassembled by simply removing the end cover 121, and then taking out the support member 4 from the open end of the accommodating portion 12, so that the mounting and disassembly of the support member 4 are more convenient, and the replacement of the support member 4 is convenient.

In an embodiment, referring to FIG. 2 and FIG. 6, a central axis of the accommodating portion 12 is perpendicular to a central axis of the body 11. For example, with reference to FIG. 2 and FIG. 6, the driven member 33 is sleeved on the first steering shaft 2, and the body 11 and the driven member 33 are arranged/disposed coaxially with the first steering shaft 2. The driving member 32 is arranged/disposed coaxially with the accommodating portion 12, and the driving member 32 and the accommodating portion 12 are extend in a radial direction of the first steering shaft 2. In this way, the structure of the entire housing 1 is simple, the processing is convenient, and the arrangement of the feeling driver 31, the driving member 32, and the driven member 33 is convenient. Further, the driving member 32 located in the accommodating portion 12 and the driven member 33 located in the body 11 can be better engaged to ensure that the feel of the vehicle driving can be more realistically simulated.

In some embodiments of the present disclosure, with reference to FIG. 2, the accommodating portion 12 and the body 11 may be formed in one piece. In this way, impurities such as the dust can be prevented from entering an interior of the housing 1 due to a gap generated at a connection between the accommodating portion 12 and the body 11, so as to effectively improve the tightness of the entire housing 1, ensure the normal operation of the driving member 32 and the driven member 33, and improve the reliability of the vehicle steering system 100 to simulate the driving feel. Moreover, the accommodating portion 12 and the housing 1 can be connected without other parts, so that a quantity of parts of the entire vehicle steering system 100 can be reduced, the structure of the vehicle steering system 100 can be made simpler, and the cost can be reduced. In addition, by integrally forming the accommodating portion 12 and the body 11, the integrity of the entire vehicle steering system 100 can be improved, the vehicle steering system 100 and the mounting and disassembly are more convenient, and the assembly and disassembly efficiency can be effectively improved.

In an embodiment, as shown in FIG. 2 to FIG. 4, the feeling driver 31 is detachably connected to the accommodating portion 12. In this way, the mounting and disassembly between the feeling driver 31 and the accommodating portion 12 are more convenient. When maintaining or replacing the feeling driver 31, the feeling driver 31 is merely removed from the accommodating portion 12. The operation is more convenient and can improve the efficiency of the maintenance and replacement. For example, in the example of FIG. 2 to FIG. 4, the feeling driver 31 and the accommodating portion 12 are connected by a threaded fastener such as a screw, so that a secure connection between the feeling driver 31 and the accommodating portion 12 can be realized, and the cost is low. Certainly, the feeling driver 31 and the accommodating portion 12 can also be detachably connected by other means, such as a snap structure. It may be understood that a connection manner between the feeling driver 31 and the accommodating portion 12 can be determined according to an actual need to better meet a practical application.

In some embodiments of the present disclosure, referring to FIG. 3 and FIG. 4, the driving member 32 is a worm and the driven member 33 is a worm gear meshed with the worm. In this way, the worm gear is meshed with the worm, so that the transmission is more stable and reliable while ensuring that the real feeling during vehicle driving can be effectively simulated, thereby reducing the noise of the vehicle steering system 100. In addition, the worm gear and the worm are compact in structure, which can effectively save the space occupied by the vehicle steering system 100.

Further, in an embodiment, a spiral angle of the worm gear is $\beta$, where $\beta$ satisfies: $30°\leq\beta\leq40°$. Through the configuration, a worm gear and worm mechanism may be a mechanism without the self-locking function, so that the worm can rotate clockwise under the drive of the output shaft of the feeling driver 31, and may also rotate counterclockwise under the drive of the output shaft. Therefore, a resistance can be provided when the first steering shaft 2 drives the worm gear to turn, so as to simulate the steering damping feeling, and assistance can be provided when the first steering shaft 2 drives the worm gear to restore, so as to simulate the restoring force. In this way, the structure is more reliable.

Certainly, the present disclosure is not limited thereto. In some embodiments of the present disclosure, the driving member 32 and the driven member 33 may also be helical gears meshing with each other (not shown in the figure). As a result, the real feel of the vehicle driving can also be effectively simulated, the structure is compact, the transmission is relatively accurate, the transmission efficiency is high, the operation is reliable, and the service life is long.

In the vehicle steering system 100 according to the embodiments of the present disclosure, when the vehicle steering system 100 is the steering-by-wire system, the driving simulation system, and the like, the feeling driver 31 can drive the output shaft to drive the driving member 32 to rotate and provide the torque for the driven member 33 to simulate the real driving feel such as the steering damping, the restoring force and the road feel simulation torque. The structure is simple and the operation is convenient. Moreover, the torque detector and the driving computer can be configured to detect the driving condition of the vehicle and the driving attitude of the driver. Therefore, the feedback force of the vehicle steering system 100 by the driving condition and the driving attitude can be simulated, so as to provide the driver with a more realistic road feeling. In this way, the safety detector can be configured to play a role of vibration warning when there is a safety risk in driving. In this way, the vibration feeling can be provided to the driver and at least one of the fatigue driving warning, the lane departure warning, the collision warning, the lane change blind area warning, and the reverse collision warning can be realized, which can effectively improve the driving safety. Besides, the structure of the entire vehicle steering system 100 is compact and small, which can effectively improve the assembly and disassembly efficiency, and has the good sealing performance, which can prevent the impurities such as the dust from entering the interior of the housing 1. Therefore, the normal operation of the driving member 32 and the driven member 33 can be guaranteed, which has a high reliability.

Figure 13:
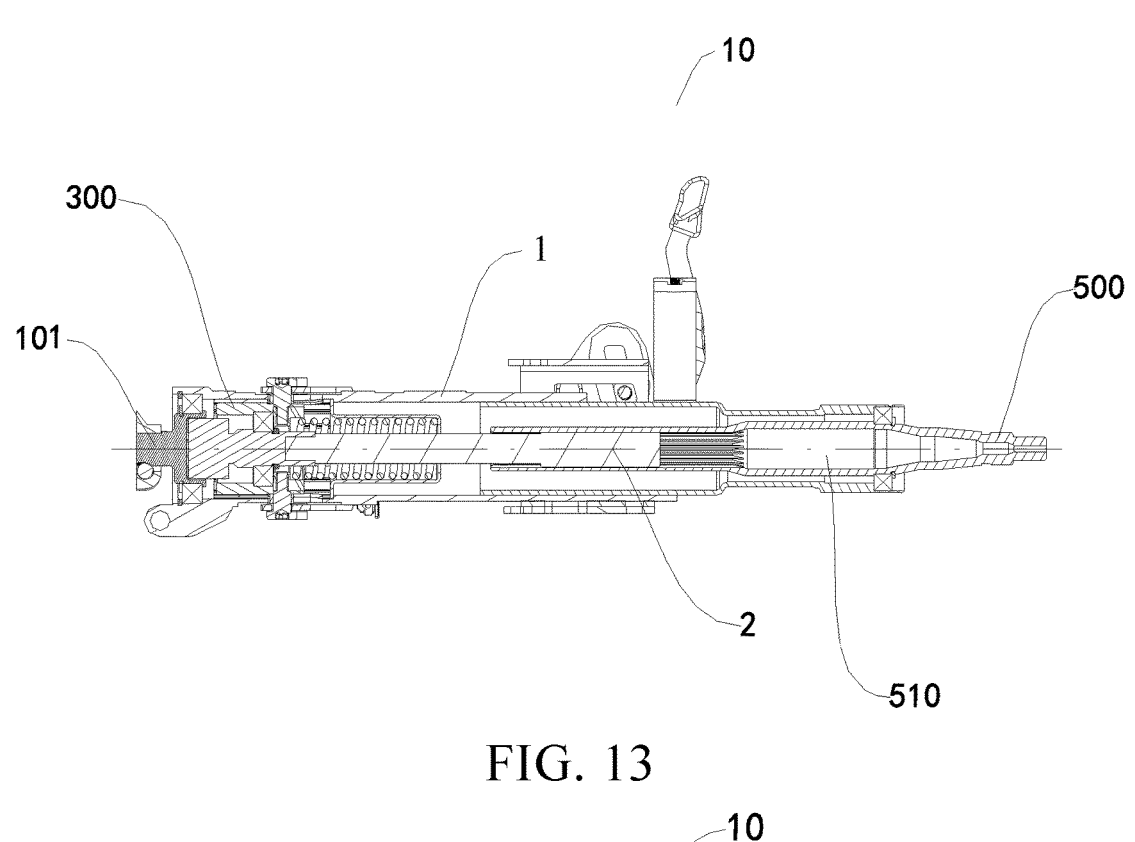
FIG. 13 is a cross-sectional view of a coupling device of a vehicle steering system according to an embodiment of the present disclosure, where a second transmission shaft is located at a coupling position.
Figure 17:
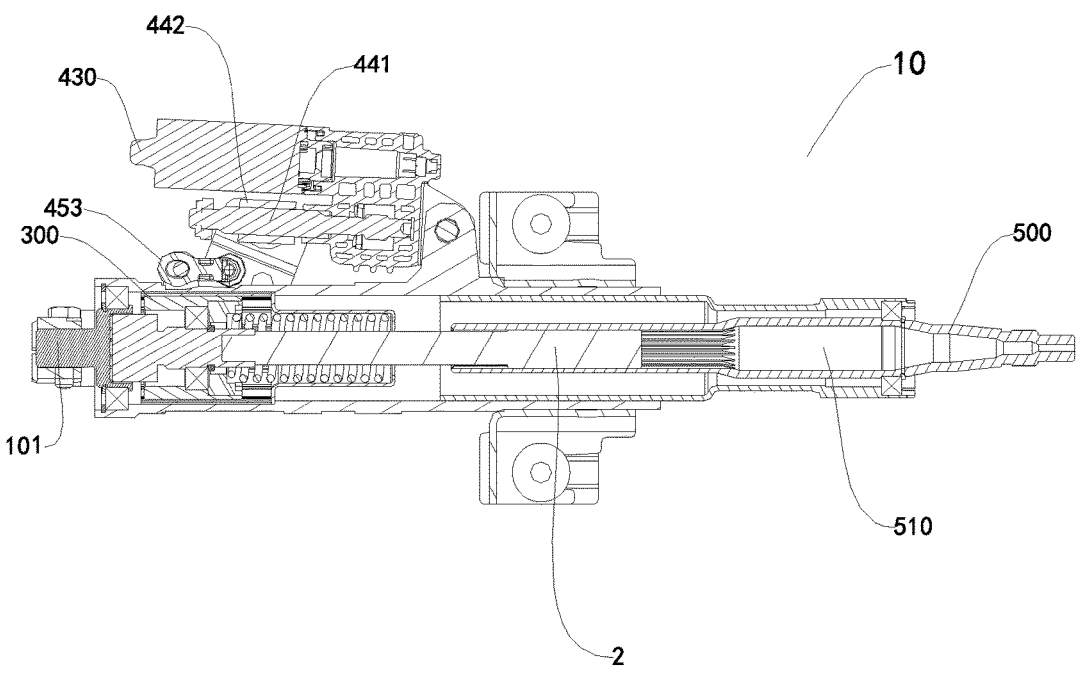
FIG. 17 is a cross-sectional view of a coupling device of a vehicle steering system according to an embodiment of the present disclosure from another perspective, where a second transmission shaft is located at a coupling position.
Figure 18:
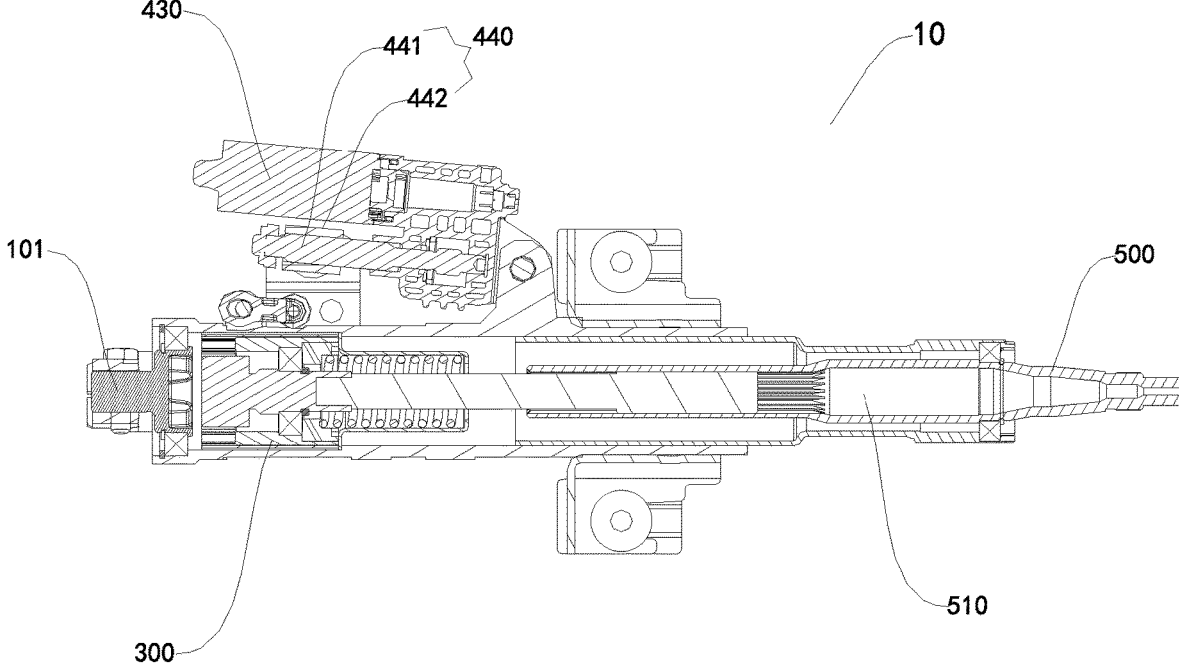
FIG. 18 is a cross-sectional view of a coupling device of a vehicle steering system according to an embodiment of the present disclosure from another perspective, where a second transmission shaft is located at a decoupling position.

According to some embodiments of the present disclosure, as shown in FIG. 13, FIG. 14, FIG. 17, and FIG. 18, the vehicle steering system 100 further includes a coupling device 10. The coupling device 10 includes a second steering shaft 101 and a first steering shaft 2. The first steering shaft 2 is connected to the steering gear. The first steering shaft 2 is configured to move between a coupling position and a decoupling position. The first steering shaft 2 combines with the second steering shaft 101 at the coupling position and transmits a steering torque of the steering gear. In this case, the synchronous rotation between the second steering shaft 101 and the first steering shaft 2 can be realized, as shown in FIG. 13 and FIG. 17. The first steering shaft 2 is decoupled from the second steering shaft 101 at the decoupling position and the transmission of the steering torque of the steering gear is interrupted. In this case, the second steering shaft 101 and the first steering shaft 2 can be rotated separately, as shown in FIG. 17 and FIG. 18. The feeling simulator 3 is connected with the first steering shaft 2. A feeling simulator 3 simulates the feel of the first steering shaft 2 at the coupling position when the first steering shaft 2 is at the decoupling position.

By dividing the coupling device 10 into the second steering shaft 101 and the first steering shaft 2, and the first steering shaft 2 is connected to the steering gear, the second steering shaft 101 can be connected to the wheel. When the second steering shaft 101 contacts the first steering shaft 2, the synchronous movement of the steering gear and the wheel can be realized. When the second steering shaft 101 and the first steering shaft 2 are decoupled, the steering gear and the wheel can be moved separately. By connecting the feeling simulator 3 with the first steering shaft 2, the first steering shaft 2 can transfer the force of the feeling simulator 3 to the steering gear. In this way, the structure of the coupling device 10 is more reasonable.

Figure 15:
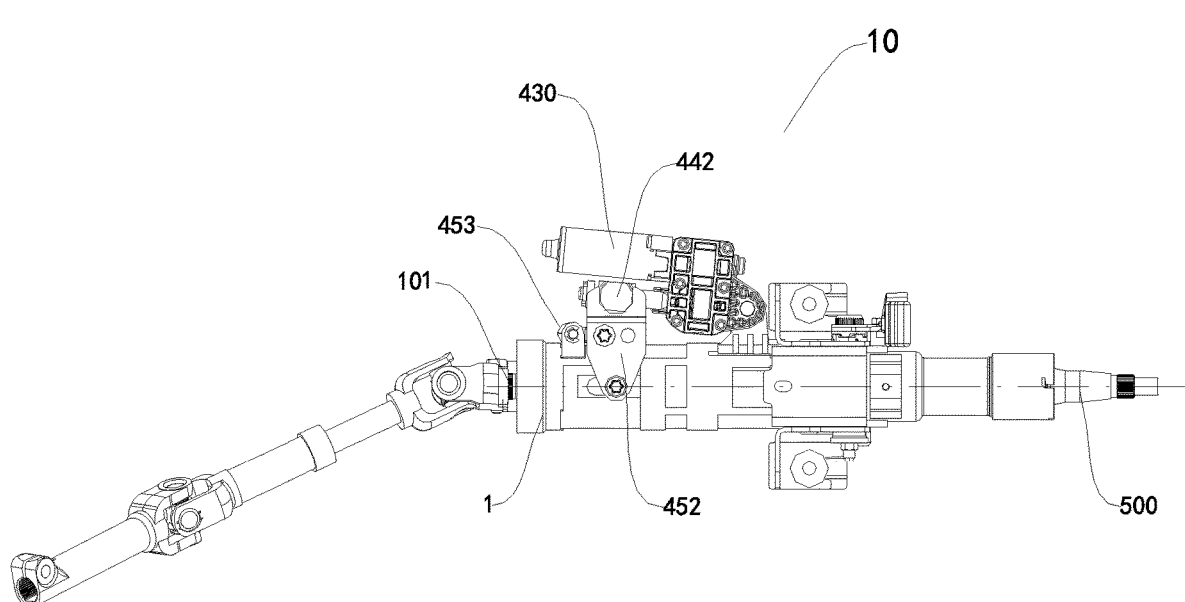
FIG. 15 is a schematic structural diagram of a coupling device of a vehicle steering system according to an embodiment of the present disclosure, where a second transmission shaft is located at a decoupling position.
Figure 16:
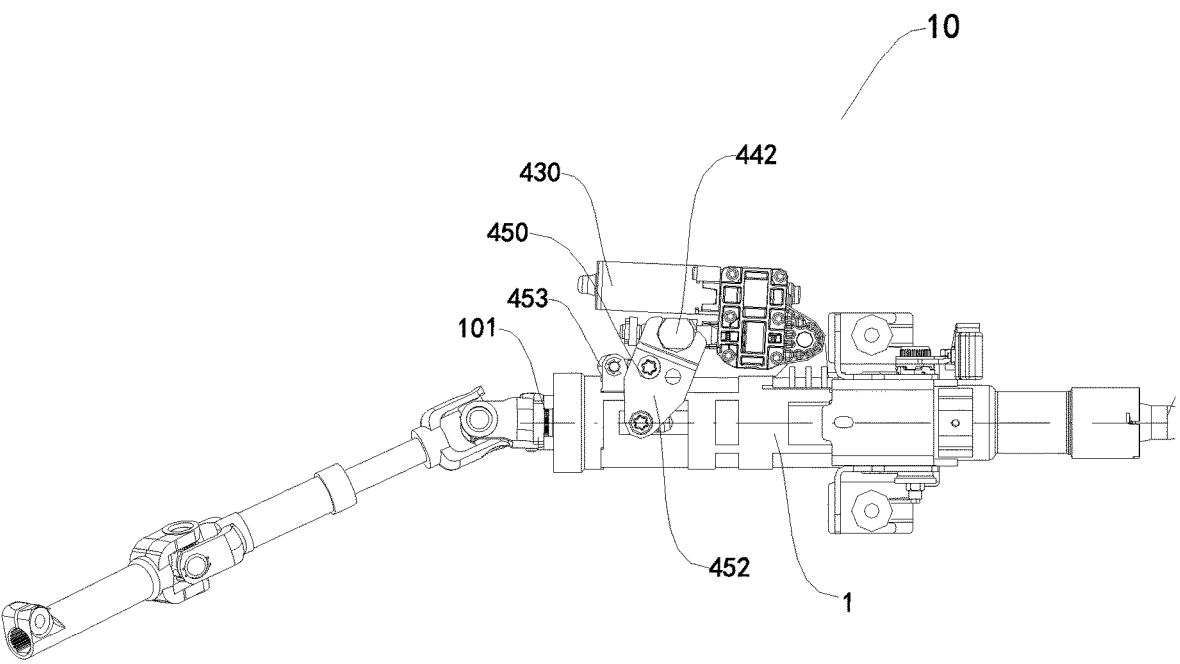
FIG. 16 is a schematic structural diagram of a coupling device of a vehicle steering system according to an embodiment of the present disclosure, where a second transmission shaft is located at a coupling position.
Figure 19:
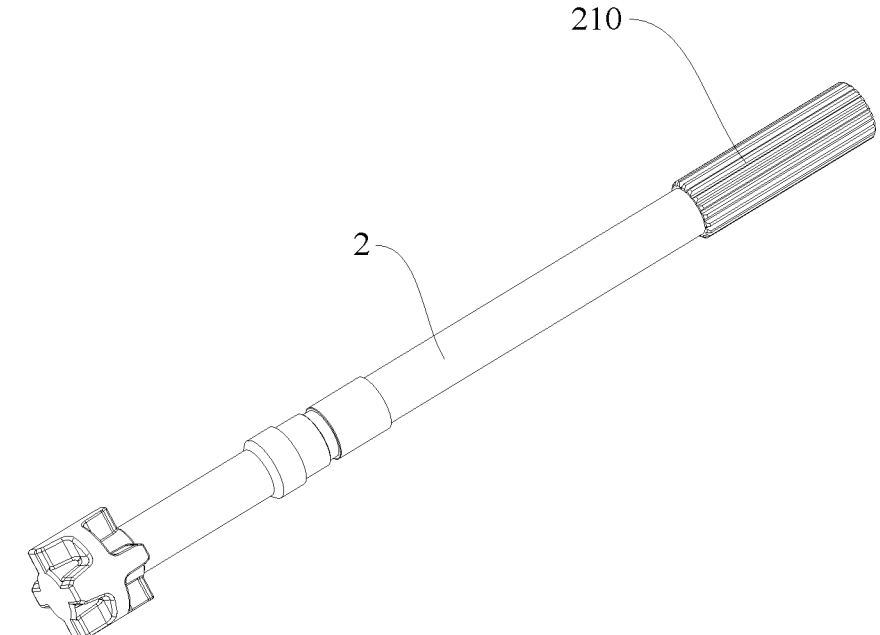
FIG. 19 is a schematic structural diagram of a second transmission shaft of a coupling device of a vehicle steering system according to an embodiment of the present disclosure.

According to some embodiments of the present disclosure, as shown in FIG. 15, FIG. 16, and FIG. 19, the coupling device 10 further includes a third transmission shaft 500. The first steering shaft 2 is connected to the steering gear through the third transmission shaft 500. The first steering shaft 2 is engaged with the third transmission shaft 500 to transmit the steering torque of the steering gear, and the first steering shaft 2 can move between the coupling position and the decoupling position relative to the third transmission shaft 500.

Therefore, the first steering shaft 2 can be rotated synchronously with the steering gear through the third transmission shaft 500. When the first steering shaft 2 moves between the coupling position and the decoupling position, the position of the steering gear remains unchanged, which improves a fixed position of the steering gear held by a passenger and optimizes the driving experience.

In some embodiments of the present disclosure, the third transmission shaft 500 is configured with a cavity 510. The first steering shaft 2 extends into the cavity 510. An inner peripheral surface of the third transmission shaft 500 is configured with multiple splines. Each spline extends along an axial direction of the third transmission shaft 500, and the multiple splines are arranged/disposed along the circumferential direction of the third transmission shaft 500. An outer peripheral surface of the first steering shaft 2 is configured with multiple spline grooves 210. Each spline groove 210 extends in the axial direction of the first steering shaft 2, and the multiple spline grooves 210 are arranged in a circumferential direction of the first steering shaft 2. The multiple splines engage with the multiple spline grooves 210. In this way, while facilitating the function of transmitting the steering torque between the first steering shaft 2 and the third transmission shaft 500, a relative sliding between the first steering shaft 2 and the third transmission shaft 500 along the axial direction of the first steering shaft 2 (that is, the axial direction of the third transmission shaft 500) is also facilitated.

Figure 10:
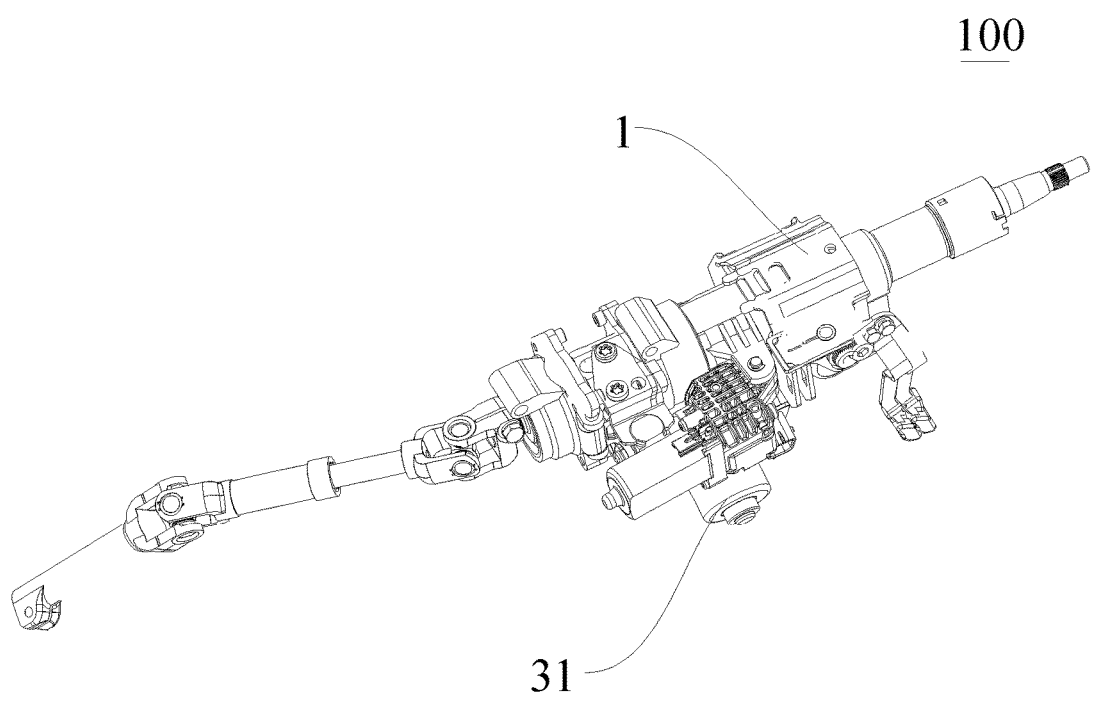
FIG. 10 is a schematic structural diagram of a vehicle steering system according to some other embodiments of the present disclosure.
Figure 11:
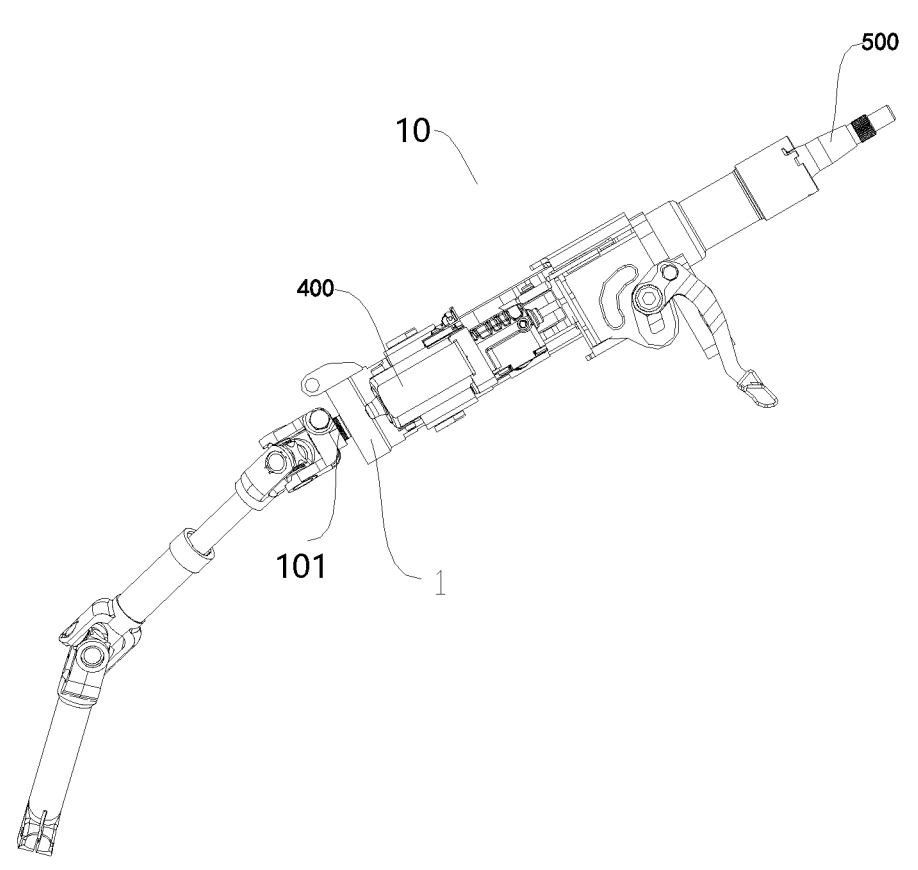
FIG. 11 is a schematic structural diagram of a coupling device of a vehicle steering system according to an embodiment of the present disclosure.
Figure 12:
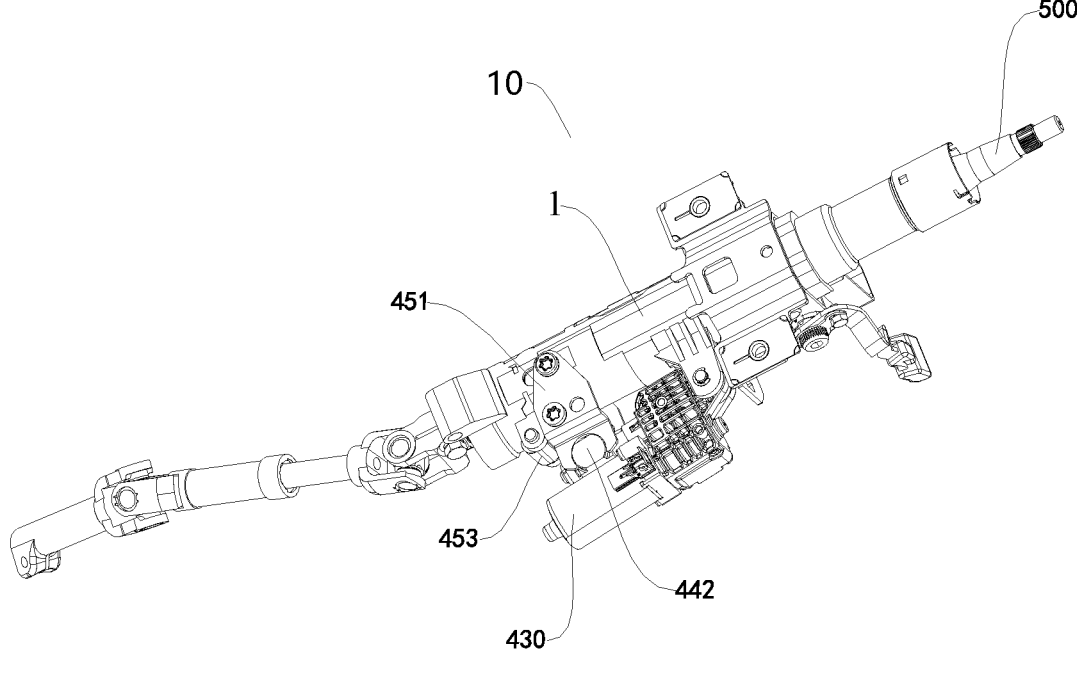
FIG. 12 is a schematic structural diagram of a coupling device of a vehicle steering system from another perspective according to an embodiment of the present disclosure.
Figure 14:
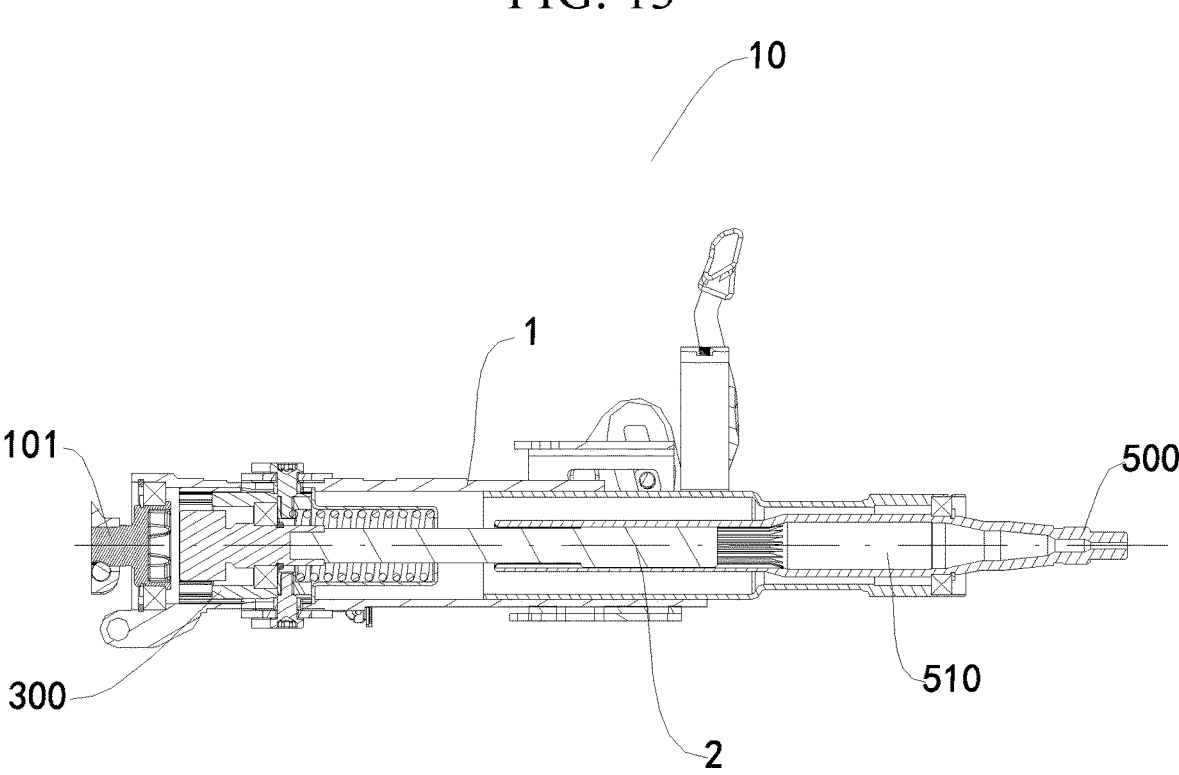
FIG. 14 is a cross-sectional view of a coupling device of a vehicle steering system according to an embodiment of the present disclosure, where a second transmission shaft is located at a decoupling position.

According to some embodiments of the present disclosure, as shown in FIG. 10, FIG. 13 and FIG. 14, the coupling device 10 further includes a shaft sleeve 300 and a driving assembly 400. The shaft sleeve 300 is sleeved on the first steering shaft 2. The shaft sleeve 300 is axially fixed/coupled to the first steering shaft 2 and configured to rotate relative to the first steering shaft 2. The driving assembly 400 is connected to the shaft sleeve 300. The driving assembly 400 drives the first steering shaft 2 to move between the coupling position and the decoupling position through the shaft sleeve 300. In this way, the driving assembly 400 can provide a driving force for the first steering shaft 2, so as to facilitate the movement of the first steering shaft 2. A direct contact is not required between the first steering shaft 2 and the driving assembly 400 by arranging/disposing the shaft sleeve 300. When the first steering shaft 2 can be displaced along the axis, it also ensures that the first steering shaft 2 can rotate relative to the driving assembly 400. That is to say, the presence of the driving assembly 400 does not interfere with the rotation of the first steering shaft 2.

According to some embodiments of the present disclosure, as shown in FIG. 15, FIG. 16, and FIG. 19, at least a part of the second steering shaft 101, at least a part of the first steering shaft 2 and the shaft sleeve 300 are arranged/disposed in the housing 1. For example, a part of the second steering shaft 101, a part of the first steering shaft 2, a part of the shaft sleeve 300, and a part of the third transmission shaft 500 are located in the housing 1. The driving assembly 400 is mounted outside the housing 1.

By the configuration of the housing 1, on the one hand, a mounting position is provided for the driving assembly 400, and on the other hand, a direct contact area between the second steering shaft 101, the first steering shaft 2, and the shaft sleeve 300 and the outside world can be reduced, and the damage probability of the second steering shaft 101, the first steering shaft 2, and the shaft sleeve 300 can be reduced.

According to some embodiments of the present disclosure, as shown in FIG. 17 and FIG. 18, the driving assembly 400 includes a driving device 430, a transmission mechanism 440, and a connecting rod mechanism 450. The driving device 430 is hinged to the housing 1. The transmission mechanism 440 is drive-connected to the driving device 430. The connecting rod mechanism 450 is hinged to the transmission mechanism 440, the housing 1, and the shaft sleeve 300.

In this way, a structure of the driving assembly 400 is reasonable, which is convenient for the transmission of the driving force, and the driving assembly 400 is separated, which reduces the difficulty of production. The connecting rod is configured to drive the shaft sleeve 300 and the first steering shaft 2, which not only makes the force transmission more reliable and labor-saving, but also facilitates the elimination of the turning torque of the shaft sleeve 300 and ensures that the shaft sleeve 300 can continue to move linearly.

By configuring the connecting rod mechanism 450, while realizing the transmission of the driving force between the driving device 430 and the first steering shaft 2, the connecting rod mechanism 450 can increase the force driving the movement of the first steering shaft 2. Therefore, the requirement for the driving force outputted by the driving device 430 can be reduced, thereby reducing the cost of the driving device 430. Moreover, the connecting rod mechanism 450 can expand the movement stroke of the first steering shaft 2, and can realize a long-distance transmission of the driving force between the driving device 430 and the first steering shaft 2. By using the diversity of the transmission direction of the connecting rod mechanism 450, the shaft sleeve 300 and the first steering shaft 2 can be driven to move according to a predetermined path while reducing a position requirement of the driving device 430 and improving the flexibility of a layout of the driving device 430.

According to some embodiments of the present disclosure, as shown in FIG. 17 to FIG. 18, the connecting rod mechanism 450 includes a first connecting rod 451, a second connecting rod 452, and a third connecting rod 453. One end of the first connecting rod 451 is hinged to the transmission mechanism 440, and the other end of the first connecting rod 451 is hinged to the shaft sleeve 300. One end of the second connecting rod 452 is hinged to the transmission mechanism 440, and the other end of the second connecting rod 452 is hinged to the shaft sleeve 300. In this way, the connecting rod mechanism 450 can drive the shaft sleeve 300 through two paths, and the driving force of the connecting rod mechanism 450 to the shaft sleeve 300 is more dispersed, thereby improving the stability of the movement of the shaft sleeve 300.

Moreover, one end of the third connecting rod 453 is hinged to the housing 1, and the other end of the third connecting rod 453 is hinged to the first connecting rod 451 and the second connecting rod 452. In this way, a relative position between the first connecting rod 451 and the second connecting rod 452 is stable, and the two ends of the first connecting rod 451 and the two ends of the second connecting rod 452 can swing with the third connecting rod 453 as a fulcrum.

The vehicle (not shown in the figure) according to an embodiment of the present disclosure includes the vehicle steering system 100 according to any of the above embodiments of the present disclosure.

The vehicle according to an embodiment of the present disclosure, by adopting the vehicle steering system 100, can be configured to simulate the real driving feel such as the steering damping feeling and the restoring force, and functions such as the road feeling feedback and the vibration prompt can also be realized, so as to ensure the authenticity of the simulation.

Other configurations and operations of the vehicle according to the embodiments of the present disclosure are known to those of ordinary skill in the art and will not be described in detail herein.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anti-clockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

In the descriptions of the present disclosure, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In the present disclosure, exemplary descriptions of the foregoing terms do not necessarily refer to the same embodiment or example.

Although the embodiments of the present disclosure have been shown and described, a person of ordinary skill in the art should understand that various changes, modifications, replacements, and variations may be made to the embodiments without departing from the principles and spirit of the present disclosure, and the scope of the present disclosure is as defined by the appended claims and their equivalents.

What is claimed is:

1. A vehicle steering system, comprising:
   a housing;
   a first steering shaft disposed in the housing, wherein the first steering shaft is configured to be coupled to a steering gear to transmit a steering torque, or the first steering shaft is configured to be decoupled from the steering gear to interrupt a transmission of the steering torque;
   a feeling simulator, connected with the first steering shaft, wherein in response to that the first steering shaft and the steering gear interrupt the transmission of the steering torque, the feeling simulator is configured to simulate a steering feeling of the transmission of the steering torque by the first steering shaft and the steering gear;
   a safety detector, configured to detect whether a driver drives safely; and
   a controller, configured to communicate with the safety detector and a feeling driver, wherein
   in response to that the safety detector detects a safety risk of the driver in the driving, the controller controls the feeling driver to provide a vibration force to drive the first steering shaft to rotate forward and backward.

2. The system according to claim 1, wherein the feeling simulator comprises:
   the feeling driver, having an output shaft and disposed on the housing;
   a driving member, fixed on the output shaft; and
   a driven member, fixed on the first steering shaft and engaged with the driving member.

3. The system according to claim 2, further comprising:
   a rotation angle detector, configured to detect a rotation direction of the first steering shaft; and
   the controller, configured to communicate with the rotation angle detector and the feeling driver, wherein
   in response to that the first steering shaft turns, the controller controls the feeling driver to provide a resistance against the turning of the first steering shaft from an original position; and
   in response to that the first steering shaft restores to the original position, the controller controls the feeling driver to provide assistance to the restoring of the first steering shaft.

4. The system according to claim 2, further comprising:
   a torque detector, configured to detect a driving condition of a vehicle and transmit a first torque signal; and
   the controller, configured to communicate with the torque detector and the feeling driver, receive the first torque signal, and control, according to the first torque signal, the feeling driver to provide the first steering shaft with a first road feel simulation torque that simulates a first road feel torque transmitted by the first steering shaft and the steering gear.

5. The system according to claim 4, further comprising:
   a driving computer, configured to communicate with the controller and detect a driving attitude of the vehicle and transmit a second torque signal to the controller, wherein the controller is configured to control, according to the second torque signal, the feeling driver to provide the first steering shaft with a second road feel simulation torque that simulates a second road feel torque transmitted by the first steering shaft and the steering gear.

6. The system according to claim 1, wherein the safety detector comprises at least one of a fatigue detector, a lane departure detector, a collision detector, a lane change blind area detector, or a reversing collision detector.

7. The system according to claim 2, wherein the housing comprises:
   a body, wherein the first steering shaft and the driven member are disposed in the body; and
   an accommodating portion, protruding from an outer surface of the body, wherein an interior of the accommodating portion is in communication with an interior of the body, and the driving member is disposed in the accommodating portion.

8. The system according to claim 7, wherein a part of the driving member extends into the body and is engaged with the driven member.

9. The system according to claim 7, wherein an end of the output shaft extends into the accommodating portion from a first end of the accommodating portion and is coupled to a first end of the driving member; a support member is disposed on a second end of the accommodating portion; and the a second end of the driving member extends through the support member.

10. The system according to claim 9, wherein the second end of the accommodating portion is open and comprises an end cover.

11. The system according claim 7, wherein a central axis of the accommodating portion is perpendicular to a central axis of the body.

12. The system according to claim 7, wherein the accommodating portion and the body are formed as one piece.

13. The system according to claim 7, wherein the feeling driver is connected to the accommodating portion.

14. The system according to claim 2, wherein the driving member comprises a worm; and the driven member comprises a worm gear meshed with the worm.

15. The system according to claim 14, wherein a spiral angle of the worm gear is β, where $30° \leq \beta \leq 40°$.

16. The system according to claim 1, further comprising a coupling device, wherein the coupling device comprises the first steering shaft and a second steering shaft; the first steering shaft is connected with the steering gear; the first steering shaft is configured to move between a coupling position and a decoupling position; the first steering shaft is coupled with the second steering shaft at the coupling position and transmits the steering torque of the steering gear; and the first steering shaft is decoupled from the second steering shaft at the decoupling position and interrupts the transmission of the steering torque of the steering gear.

17. The system according to claim 16, wherein the coupling device further comprises a third steering shaft; the first steering shaft is connected to the steering gear through the third steering shaft; the first steering shaft is engaged with the third steering shaft to transmit the steering torque of the steering gear; and the first steering shaft is configured to move between the coupling position and the decoupling position with respect to the third steering shaft.

18. The system according to claim 16, wherein the coupling device further comprises:
   a shaft sleeve, sleeved on the first steering shaft, wherein the shaft sleeve is coupled with the first steering shaft and configured to rotate with respect to the first steering shaft; and
   a driving assembly, connected with the shaft sleeve, wherein the driving assembly is configured to drive the first steering shaft to move between the coupling position and the decoupling position through the shaft sleeve.

19. A vehicle, comprising a vehicle steering system comprising:
   a housing;
   a first steering shaft, disposed in the housing, wherein the first steering shaft is configured to be coupled with a steering gear to transmit a steering torque, or the first steering shaft is configured to be decoupled from the steering gear to interrupt a transmission of the steering torque;
   a feeling simulator, connected with the first steering shaft, wherein in response to that the first steering shaft and the steering gear interrupt the transmission of the steering torque, the feeling simulator is configured to simulate a steering feeling of the transmission of the steering torque by the first steering shaft and the steering gear;
   a safety detector, configured to detect whether a driver drives safely; and
   a controller, configured to communicate with the safety detector and a feeling driver, wherein
   in response to that the safety detector detects a safety risk of the driver in the driving, the controller controls the feeling driver to provide a vibration force to drive the first steering shaft to rotate forward and backward.

\* \* \* \* \*